United States Patent

[11] 3,534,671

| [72] | Inventor | Noboru Yamaguchi Chigasaki-shi, Japan |
|---|---|---|
| [21] | Appl. No. | 627,728 |
| [22] | Filed | April 3, 1967 |
| [45] | Patented | Oct. 20, 1970 |
| [73] | Assignee | Nippon Kogaku K.K. Tokyo, Japan a corporation of Japan |

[54] STRUCTURE OF EYEPIECE PORTION OF THE FINDER IN SINGLE LENS REFLEX CAMERAS
2 Claims, 5 Drawing Figs.

[52] U.S. Cl.................................................. 95/42, 88/1.5, 350/173, 350/286
[51] Int. Cl...................................................... G03b 19/12
[50] Field of Search............................................ 95/42; 350/173, 175(E), 286; 88/1.5

[56] References Cited
UNITED STATES PATENTS

| 1,253,796 | 1/1918 | Douglass................... | 350/173X |
| 3,264,964 | 8/1966 | Ebert....................... | 95/42 |

OTHER REFERENCES

Harrick, N.J., A Continuously Variable Optical Beam Splitter and Intensity Controller, November, 1963, Vol. 2, No. 11, Apried Optics

*Primary Examiner*—Norton Ansher
*Assistant Examiner*—Richard L. Moses
*Attorney*—Anton J. Wille ABSTRACT: A viewfinder is provided for a single lens reflex camera incorporating a built-in exposure meter, wherein any extraneous light rays entering pentaprism from the eyepiece are deflected away from the viewing and photometric axes. A pair of wedge prisms are interposed between the pentaprism and the eyepiece of the viewfinder, the prisms being formed with mating surfaces angularly disposed with respect to the ocular axis, the mating surfaces being separated by an air space. The extraneous light rays having a large angle of incidence are deflected by a surface of a prism, the viewing light rays having a relatively small angle of incidence passing through the prisms into the eyepiece.

Patented Oct. 20, 1970 3,534,671
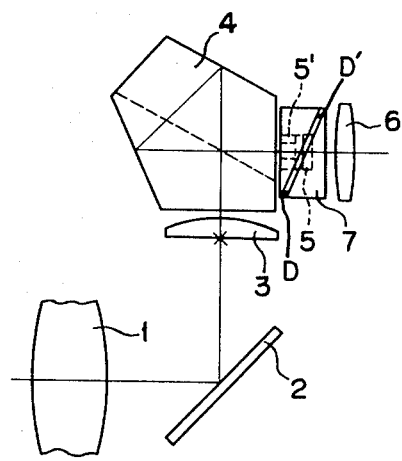
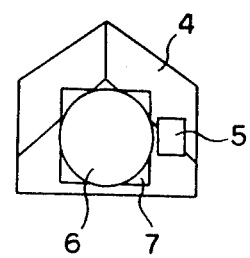
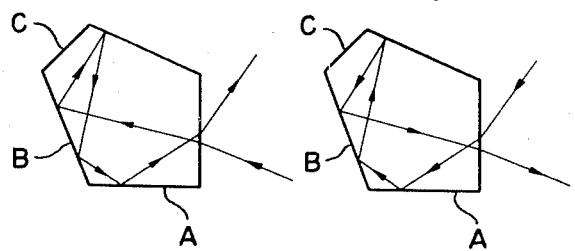
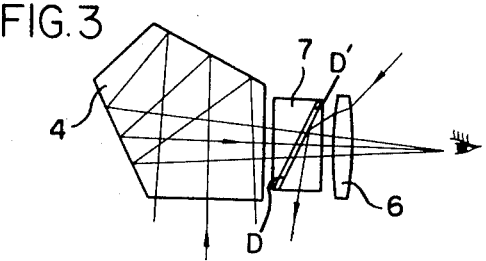

STRUCTURE OF EYEPIECE PORTION OF THE FINDER IN SINGLE LENS REFLEX CAMERAS

The present invention relates to the structure of the eyepiece portion of the viewfinder in single lens reflex cameras.

In a single lens reflex camera, the light rays passing through the camera lens illuminate the focussing plate of the viewfinder and are measured to determine the proper exposure of the subject to be photographed. Due to extraneous light rays falling upon the eyepiece lens of the viewfinder and being reflected into and within the pentaprism forming a part of the viewfinder, the exposure meter associated with the viewfinder provides an incorrect reading of the light value. There have been proposed various methods for removing the extraneous light rays, but such methods are not entirely satisfactory in that the field of view of the finder is darkened, or complicated mechanisms are provided on or in the camera body making the operation of the camera inconvenient.

The object of the present invention is to remove these difficulties and complications by providing an air-spaced surface, which is angularly disposed with respect to the ocular axis in order to deflect the light rays of a certain angle which would otherwise fall upon the exposure meter photocell provided adjacent to the optical system of the finder.

The features and advantages of the present invention will become more apparent from the following explanation in conjunction with the illustrative embodiment of the invention shown in the drawing, in which:

FIG. 1A is a schematic lens diagram according to the present invention showing a side view thereof and FIG. 1B is the front view of the prism portion thereof;

FIG. 2A shows the light paths of the extraneous light rays within the prism projected from the eyepiece portion, the rays entering from below the viewing axis of the prism being reflected onto the bottom surface of the prism, and FIG. 2B shows such rays entering from above the viewing axis and reflected from the bottom surface of the prism; while FIG. 3 is a schematic lens diagram of the embodiment of FIG. 1, illustrating a path of extraneous light and its deflection from the view finder prism.

Referring now in detail to the drawing, an objective lens 1 is illustrated which projects a light ray onto a reflecting mirror 2 from which the light ray is reflected onto a focussing plate 3. The light then enters a pentaprism 4 and falls upon a photocell 5 of the exposure meter (not shown), the photocell being adjacent to the ocular axis of the viewfinder. An eyepiece 6 is provided for viewing the scene to be photographed, a spaced prism arrangement 7 being interposed between the pentaprism and the eyepiece in such a way that the two mating surfaces of the prisms are substantially parallel and adjacent one another. The arrangement 7 is such that these surfaces act both as reflecting and transparent surfaces, as will hereinafter appear.

The extraneous light rays coming from the eyepiece are the light rays reflected repeatedly by the internal surface of the prism as shown in FIGS. 2A and 2B. Those light rays entering the prism in an upward direction as illustrated in FIG. 2A, are finally reflected by the prism surface A toward the photocell 5. These reflected rays can be blocked by a baffle plate 5' such as a light flux preventing plate or material, such as optical fiber in lattice form, on the front surface of the photocell. But, the light rays which are reflected first of all from the bottom surface A and then lastly from the silver plated surface B of the pentaprism are projected into the photocell, as shown in FIG. 2B, are almost the same as those light rays coming from the focussing plate 3 insofar as the incidence angle onto the said photocell 5 is concerned. It is therefore impossible to remove these light rays by means of a light flux preventing plate on the surface of the photocell 5.

According to the present invention, extraneous light rays entering the eyepiece at comparatively large angles with respect to the eyepiece axis are bent and enter the pentaprism 4. Depending, of course, on the angle of incidence of these extraneous light rays entering the pentaprism, some of the extraneous rays will penetrate the lower surface A of the pentaprism, while others will be absorbed by surface C, or the side walls of the prism. Those extraneous rays which enter the pentaprism 4 at an angle of approximately 40° or larger will be reflected from the surface B as in FIG. 2B and back into the photocell 5. To prevent the intrusion of the extraneous light rays, the prism arrangement 7 is interposed comprising two mating prisms separated by an air space 7'. The slant surface D of the one prism acts as a reflecting surface (FIG. 3) which deflects the extraneous rays projected by the eyepiece 6 downwardly so that these extraneous light rays do not enter the pentaprism 4. On the other hand, the viewfinder light rays entering the eyepiece lens 6 from the focussing plate 3 have comparatively small angles of incidence with the eyepiece axis of generally less than 18°, and therefore such light rays as above mentioned pass through and arrive at the eye of the observer without reflecting from the slanted surface D' of the prism arrangement 7.

In accordance with the present invention, it is possible to prevent the extraneous light rays projected by the eyepiece lens from entering the optical system of the viewfinder and being projected onto the photocell where such rays adversely affect the exposure meter complementing a single lens reflex camera.

I claim:

1. A view finder for a single lens reflex camera comprising a pentaprism, an eyepiece cooperating therewith, a light-sensitive portion of an exposure meter responsive to the finder light rays passing through the pentaprism, and a pair of wedge prisms interposed between the eyepiece and the pentaprism; said pair of wedge prisms having mating surfaces inclined with respect to the axis of the eyepiece and separated by an air space, the angle of the mating surfaces with respect to the axis of the eyepiece being such that any extraneous light rays entering from the eyepiece and having a large angle of incidence which are not blocked by the head of an observer, are totally reflected by one of the mating surfaces, the light rays of the finder light path having a comparatively small angle of incidence passing through the mating surfaces.

2. A viewfinder according to claim 1, wherein the angle of the mating surfaces is determined to reflect the extraneous light rays having an angle of incidence of approximately 40° or larger with respect to the axis of the eyepiece.